(12) United States Patent
Reches (10) Patent No.: US 11,681,066 B2
(45) Date of Patent: Jun. 20, 2023

(54) DETECTOR LOCATOR SYSTEM

(71) Applicant: Shlomo Zalman Reches, Petah Tikva (IL)

(72) Inventor: Shlomo Zalman Reches, Petah Tikva (IL)

(73) Assignee: Shlomo Zalman Reches, Petah Tikva (IL)

( * ) Notice: Subject to any disclaimer, the term of this patent is extended or adjusted under 35 U.S.C. 154(b) by 0 days.

(21) Appl. No.: 17/960,860

(22) Filed: Oct. 6, 2022

(65) Prior Publication Data
US 2023/0033023 A1    Feb. 2, 2023

Related U.S. Application Data

(62) Division of application No. 17/106,115, filed on Nov. 29, 2020, now Pat. No. 11,474,273.

(51) Int. Cl.
| | | |
|---|---|---|
| *G01V 3/08* | (2006.01) | |
| *G01J 5/10* | (2006.01) | |
| *G01V 3/38* | (2006.01) | |

(52) U.S. Cl.
CPC ............. *G01V 3/081* (2013.01); *G01J 5/10* (2013.01); *G01V 3/38* (2013.01); *G01J 2005/106* (2013.01)

(58) Field of Classification Search
CPC ... G01V 3/081; G01V 3/38; G01J 5/10; G01J 5/0022; G01J 5/0215; G01J 5/025;
(Continued)

(56) References Cited

U.S. PATENT DOCUMENTS

| | | | | |
|---|---|---|---|---|
| 4,998,059 A | * | 3/1991 | Nigon | G01R 31/60 |
| | | | | 324/67 |
| 7,500,917 B2 | * | 3/2009 | Barney | A63J 21/00 |
| | | | | 463/37 |

(Continued)

FOREIGN PATENT DOCUMENTS

| | | | | | |
|---|---|---|---|---|---|
| CN | 112292583 A | * | 1/2021 | ............. | G01D 5/344 |
| CN | 113574682 A | * | 10/2021 | ............. | G01B 11/24 |

(Continued)

OTHER PUBLICATIONS

Renesas. Introduction of Proximity Sensing. AN1436 Rev 0.00 Mar. 26, 2009 (Year: 2009).*

(Continued)

*Primary Examiner* — Patrick Assouad
*Assistant Examiner* — Sean Curtis
(74) *Attorney, Agent, or Firm* — A.C. Entis-IP Ltd; Allan. C. Entis (57) ABSTRACT

A proximity sensor comprising: a loop comprising an outer surface and an inner surface, at least a portion of the inner surface being a reflective surface; a light emitter positioned to emit light onto the reflective surface; a light detector positioned to preferentially receive light emitted from the light emitter and reflected from the reflective surface; and a processor that is configured, responsive to a set of instructions stored in a memory, to determine a degree of proximity of an object to the inner surface of the loop responsive to a reduction in an intensity of light emitted from the light emitter that is received by the light detector.

10 Claims, 10 Drawing Sheets

(58) Field of Classification Search
CPC .. G01J 5/04; G01J 5/022; G01J 5/0806; G01J 5/0265; G01J 2005/106; G06F 3/0412; G06F 3/011; G06F 3/0421; G06F 3/017; G06F 2203/04108; G06F 2203/04103; G09G 5/10; G09G 2360/145; G09G 3/20
USPC .......... 324/67, 76.19, 76.22, 207.13, 207.22, 324/326, 750.23, 754.23
See application file for complete search history.

(56) References Cited

U.S. PATENT DOCUMENTS

| | | | | |
|---|---|---|---|---|
| 7,531,775 | B1* | 5/2009 | Strawa | G01J 1/04 356/221 |
| 7,896,742 | B2* | 3/2011 | Weston | A63F 13/245 463/37 |
| 8,400,399 | B2* | 3/2013 | Geurts | A63F 13/285 345/158 |
| 10,212,788 | B2* | 2/2019 | Dünser | H05B 47/19 |
| 10,533,892 | B2* | 1/2020 | Brown | G01J 5/10 |
| 10,871,401 | B1* | 12/2020 | Parlin | G08B 13/19 |
| 11,280,671 | B2* | 3/2022 | Brown | E06B 9/68 |
| 11,474,273 | B2* | 10/2022 | Reches | G01V 8/20 |
| 11,540,377 | B2* | 12/2022 | Lee | G01S 17/04 |
| 2004/0204240 | A1* | 10/2004 | Barney | A63J 21/00 463/36 |
| 2011/0263305 | A1* | 10/2011 | Geurts | A63F 13/285 463/1 |
| 2012/0122575 | A1* | 5/2012 | Barney | A63F 13/25 463/31 |
| 2012/0261578 | A1* | 10/2012 | Scott | G01N 21/031 250/339.07 |
| 2013/0116051 | A1* | 5/2013 | Barney | A63F 13/69 463/37 |
| 2017/0087437 | A1* | 3/2017 | Vonada | G16H 20/30 |
| 2017/0122802 | A1* | 5/2017 | Brown | E06B 9/24 |
| 2017/0259145 | A1* | 9/2017 | Kline | H05B 45/10 |
| 2020/0209057 | A1* | 7/2020 | Brown | G01J 1/0474 |
| 2021/0026419 | A1* | 1/2021 | Kim | G06F 1/1658 |
| 2021/0153325 | A1* | 5/2021 | Lee | H05B 47/115 |
| 2021/0174675 | A1* | 6/2021 | Bolton | G06F 3/0412 |
| 2022/0001062 | A1* | 1/2022 | Le | A61L 9/20 |
| 2022/0091578 | A1* | 3/2022 | Ross | H04L 9/3239 |
| 2022/0163385 | A1* | 5/2022 | Brown | E06B 9/24 |
| 2022/0171085 | A1* | 6/2022 | Reches | G01V 3/081 |
| 2022/0366869 | A1* | 11/2022 | Kim | G06F 3/0412 |
| 2023/0033023 | A1* | 2/2023 | Reches | G01V 8/20 |
| 2023/0090199 | A1* | 3/2023 | Smith | G01S 7/4808 |

FOREIGN PATENT DOCUMENTS

| | | | | |
|---|---|---|---|---|
| CN | 113614562 | A * | 11/2021 | G01S 17/894 |
| CN | 115273382 | A * | 11/2022 | |
| CN | 218481873 | U * | 2/2023 | |
| EP | 2198939 | A1* | 6/2010 | A63F 13/02 |
| EP | 3770673 | A1* | 1/2021 | G01S 17/10 |
| JP | 7157023 | B2 * | 10/2022 | |
| JP | 7209584 | B2 * | 1/2023 | |
| KR | 20220155869 | A * | 11/2022 | |
| WO | WO-2004087271 | A1* | 10/2004 | A63F 9/24 |
| WO | WO-2006020486 | A2 * | 2/2006 | A63H 30/00 |
| WO | WO-2010070559 | A1* | 6/2010 | A63F 13/02 |
| WO | WO-2018051645 | A1* | 3/2018 | G02B 7/02 |

OTHER PUBLICATIONS

Omron. Technical Explanation for Photoelectric Sensors. http://www.ia.omron.com/support/guide/43/introduction.html (Year: 2016).*
Wayback date of Omron reference dated to Apr. 2016. (Year: 2016).*

* cited by examiner

DETECTOR LOCATOR SYSTEM

RELATED APPLICATIONS

The present application is a Divisional of currently pending U.S. application Ser. No. 17/106,115 filed on Nov. 29, 2020, the disclosure of which are incorporated herein by reference.

BACKGROUND

Typically, in order to detect a location of an object, the object may be equipped with a beacon that emits a signal that can be detected by an array of detectors configured to detect the signal. However, utilizing an array of detectors may be costly in term of material cost and energy usage.

SUMMARY

An aspect of an embodiment of the disclosure relates to a system and method for determining a location of a portable electromagnetic radiation (EMR) detection apparatus with respect to an array of EMR sources.

For convenience of presentation, the system in accordance with an embodiment of the disclosure may be referred to as a "Detector Locator system", the array of EMR sources may be referred as an "EMR source array", and the portable EMR detection apparatus may be referred as a "Port-Dec".

The EMR sources comprised in the EMR source array may be configured to emit EMR within a predetermined range of frequencies. An EMR source may be: a radio wave emitter configured to emit EMR within a radio wave frequency range; an infrared emitter configured to emit EMR within an infrared range; a visible light emitter configured to emit EMR within a visible light range; or an ultraviolet (UV) emitter configured to emit EMR within a UV range. Each EMR source comprised in an EMR source array may be uniquely identified with an EMR source address. The EMR source array may be an EMR source strip comprising a linear (straight or curvilinear) arrangement of EMR sources.

In an embodiment of the disclosure, the Port-Dec comprises an EMR detector configured to be sensitive to EMR emitted by the EMR sources. By way of example, in an embodiment where the EMR sources are visible light emitters, the EMR detector comprised in the EMR wand is configured to detect light in the visible spectrum. By way of another example, in an embodiment where the EMR sources are radio wave emitters, the EMR detector comprised in the EMR wand is configured to detect radio waves within the frequency range emitted by the radio wave emitters.

The Port-Dec may be configured to transmit, to a control unit, an ON signal responsive to the EMR detector receiving an EMR input within its spectral responsivity above a predetermined threshold. The control unit comprises a processor and is configured to determine the address of the EMR source whose EMR emission triggered the transmission of the detection signal by the Port-Dec.

The control unit may determine the EMR source address responsive to the detection signal based on a "request-response mode", a "timing mode" or a "trigger mode".

In a Detector Locator system configure to operate in a request-response mode, the control unit, based on a set of instructions stored in a memory and performed by a processor, is configured to: (1) turn on one of the plurality of EMR source, (2) transmits a query to the Port-Dec to transmit back to the control unit a detection signal; and (3) determines the currently on EMR source as having activated the Port-Dec if the detection signal in an ON signal indicating that the Port-Dec received EMR input above threshold.

In a Detector Locator system configured to operate in a timing mode, the control unit, based on a set of instructions stored in a memory and performed by a processor, is configured to: (1) control the EMR sources to turn on one at a time, one after the other in a sequence or in a pseudorandom pattern, and (2) determine the address of the EMR source that emitted the EMR that activated the Port-Dec to transmit an ON signal, based on the timing of the ON signal relative to the activation pattern of the EMR sources.

In a Detector Locator system configured to operate in a trigger mode, each of the EMR sources mounted in the EMR source array comprise a trigger signal receiver and a processor that is configured to instruct the EMR source to transmit a response signal encoding an EMR address, or sufficient information for determining the address of the EMR source, in response to receiving the trigger signal. The Port-Dec comprises a trigger signal generator operable to transmit the trigger signal, a response signal receiver operable to receive the response signal, and a processor operable to optionally transmit an ON signal to a control unit, wherein the ON signal encodes the EMR address, or sufficient information for the control unit the determine the EMR address.

An aspect of an embodiment of the disclosure relates to case where the plurality of EMR comprise or consist of a plurality of visible light emitters, and the control unit is configured to control the visible light emitters so that the light source determined to be in close proximity to the Port-Dec are controlled to be, or remain, in an ON state to generate an appearance of following the Port-Dec. For convenience of presentation, the above-described system in accordance with an embodiment of the disclosure may be referred to as a "Light Dragger system".

Another aspect of an embodiment of the disclosure relates to a tubular optical proximity ("TOP") sensor operable to detect proximity of an object to an inner surface of a tube. The TOP sensor may comprise a tube, which may be a passage tube comprised in a Port-Dec in accordance with an embodiment of the disclosure, wherein the inner surface of the tube comprises a reflective material. The TOP sensor further comprises a light emitter positioned to shine light on the reflective surface, a light detector positioned to detect the reflected light, and a processor operatively connected to the light detector. As used herein with respect to a TOP sensor, a transverse section of the inner surface of the tube is not limited to a circle, and may include an oval, or any shape having concave and optionally straight portions, but not convex portions, so that that the light "crawls" along the inner reflective surface of the tube to have higher intensity in regions closer to the inner surface. The processor may be configured to determine proximity of an object to the inner surface of the tube responsive to the intensity of the reflected light from the light emitter that is detected by the light detector. The TOP sensor may be configured so that a direct light path for the light detector to receive direct, un-reflected light from the light emitter is blocked. The IR detector is optionally a photodiode. The IR emitter is optionally configured to emit non-collimated light.

In an embodiment, a Port-Dec may comprise a passage tube having an interior space dimensioned to allow a support strip to be passed therethrough, and the one or more EMR detectors may be positioned on the passage tube to preferably detect EMR being emitted from an interior space of the passage tube. Optionally, the passage tube is additionally configured as a TOP sensor in accordance with an embodiment of the disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
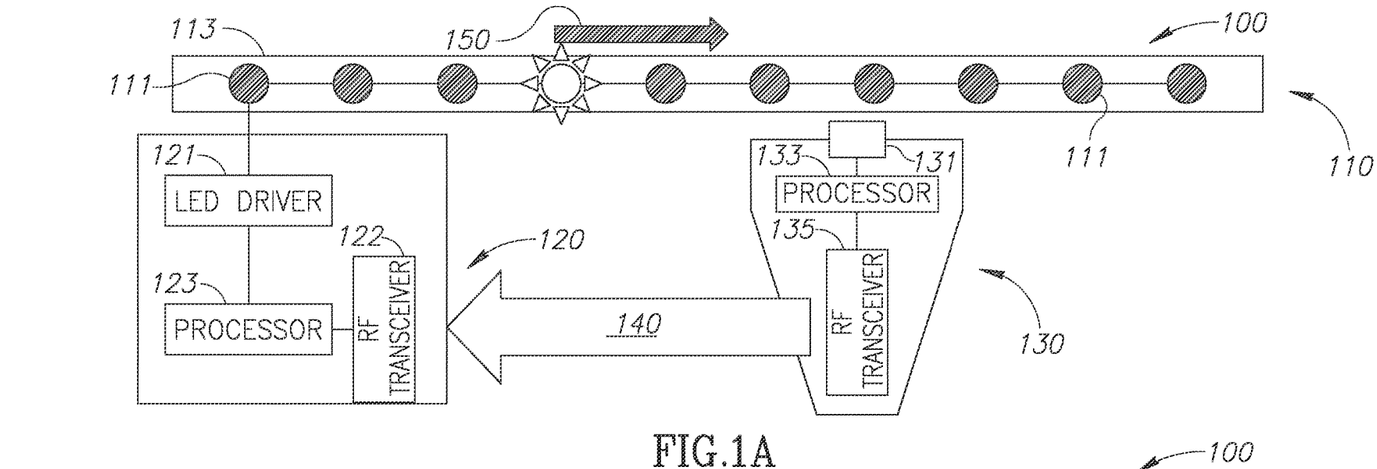
FIGS. 1A-1B schematically show a Detector Locator system configured to operate in a timing mode in accordance with an embodiment of the disclosure.
Figure 1B:
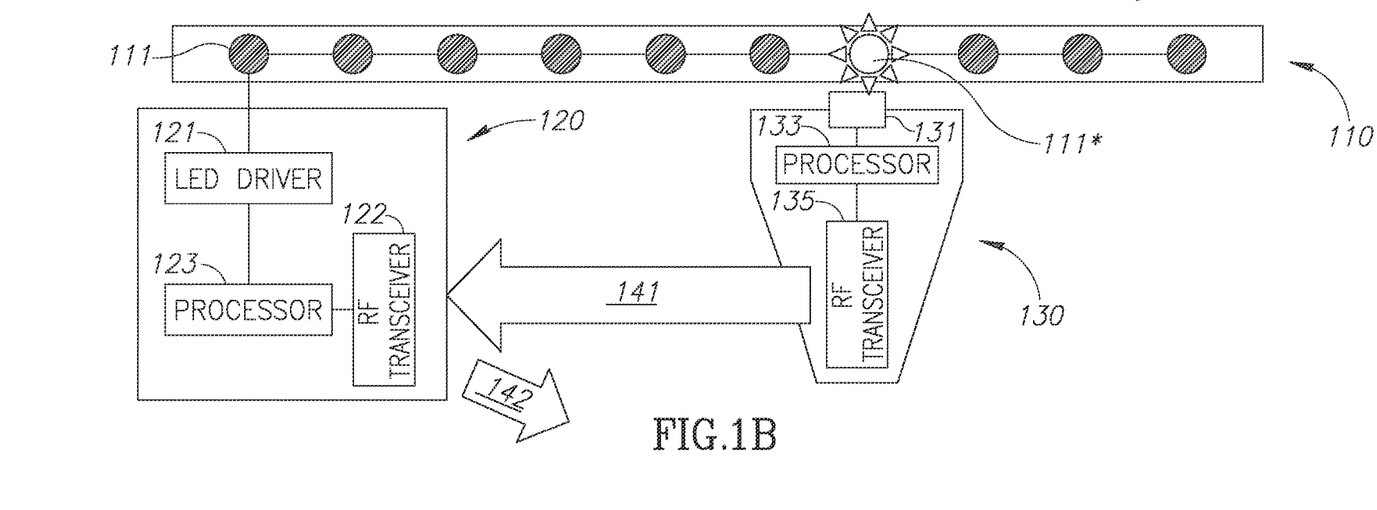

FIGS. 1A-1B schematically show a Detector Locator system 100 in accordance with an embodiment of the disclosure. Detector Locator system 100 comprises a linear light source (LS) array 110, a control untill 120, and a detector wand 130.

LS array 110 may comprise a plurality of LSs 111, optionally LEDs, that may be mounted on or embedded within a support strip 113. Support strip 113 may be made of a translucent material, so that, by way of example in an embodiment where LSs 111 are embedded within support strip 113, light generated by the LSs can traverse the support strip.

Detector wand 130 comprises a light detector 131, by way of example a photodiode, configured to detect light emitted by LSs 111. A LS 111 typically has a characteristic emission spectrum, and light detector 131 may be configured to have a spectral responsivity that matches the emission spectrum of the LSs. Detector wand 130 further comprises a wireless transceiver 135 and a processor 133 that, based on a set of instructions stored in a memory (not shown) coordinates the actions of light detector 131 and wireless transceiver 135. Detector wand 130 may be configured so that wireless transceiver 135 transmits a detection signal responsive to light detector 131 receiving a light input within its spectral responsivity, such as from a LS 111, with an intensity above a predetermined threshold.

Control unit 120 comprises a LS driver 121, to which LSs 111 are operatively connected. LS driver 121, responsive to instructions from processor 123, is configured to transmit LS control signals to control a sequence of activations and inactivations of LSs 111. Each LS 111 of LS array 110 may be identified with a unique LS ID, which may be referred to as an "LS address", and LS driver 121 may be configured to control the activation pattern of LSs 111 by transmitting a plurality of control signals, each control signal specifying an LS address. Each LS 111 may comprise a control module (not shown) operable to receive LS control signals and activate the respective LS 111 based on the contents of the LS control signals. Control unit 120 further comprises a wireless transceiver 122 configured to wirelessly communicate with Detector Wand 130, including receiving detection signals from the Detector Wand.

Figure 1C:
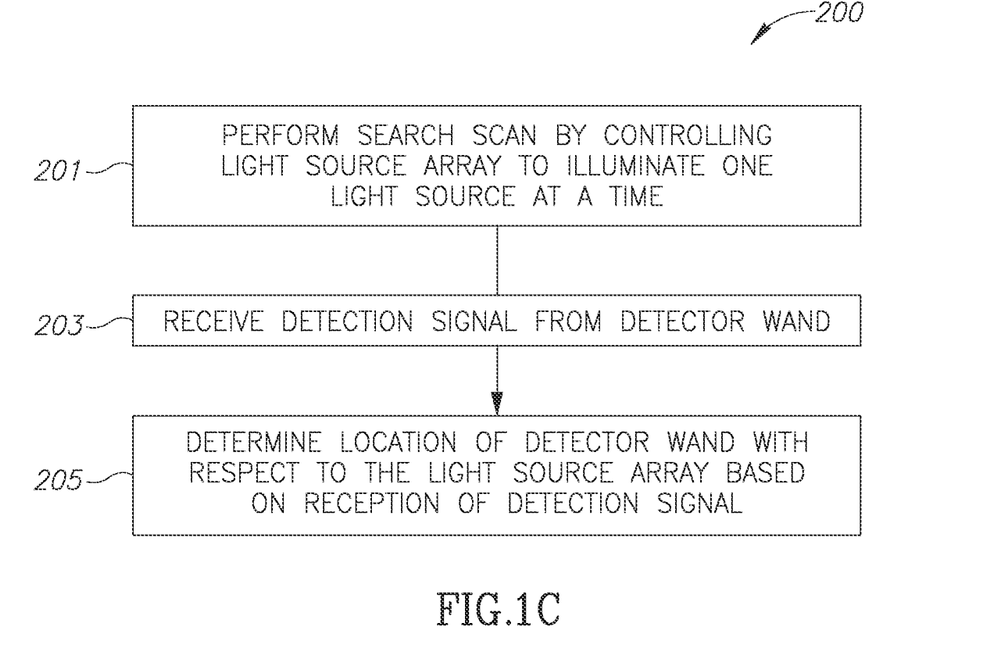
FIG. 1C shows a flowchart showing an embodiment of a Detector Wand Search method in accordance with an embodiment of the disclosure.

Reference is made to FIG. 1C in combination with FIGS. 1A-1B. FIG. 1C shows a flowchart for a Detector Wand Search procedure 200 performed by control unit 120 to, by way of example, search for Detector Wand 130 as shown in FIGS. 1A-1B. In a block 201, control unit 120 performs a global search scan, turning one LS 111 at a time, one after the other in sequence. The sequential activation of LSs 111 is schematically indicated with block arrow 150 in FIG. 1A. Whereas FIG. 1A shows sequential activation of LSs 111, the pattern of activation during the global search scan may be a pseudorandom pattern, or another pattern in which each LS of the plurality of LSs 111 are activated within a predefined time window. In a block 203, as shown in FIGS. 1A-1B, control unit 120 receives a detection signal from Detector Wand 130 that communicates detection or lack of detection of light by light detector 131. A detection signal is optionally an OFF signal indicating lack of sufficient light detection by light detector 131 or an ON signal indication detection of sufficient light be light detector 131. In a block 205, control unit 120 determines the location of Detector Wand 130 relative to LS array 110 based on the reception of detection signals from the Detector Wand.

Figure 1D:
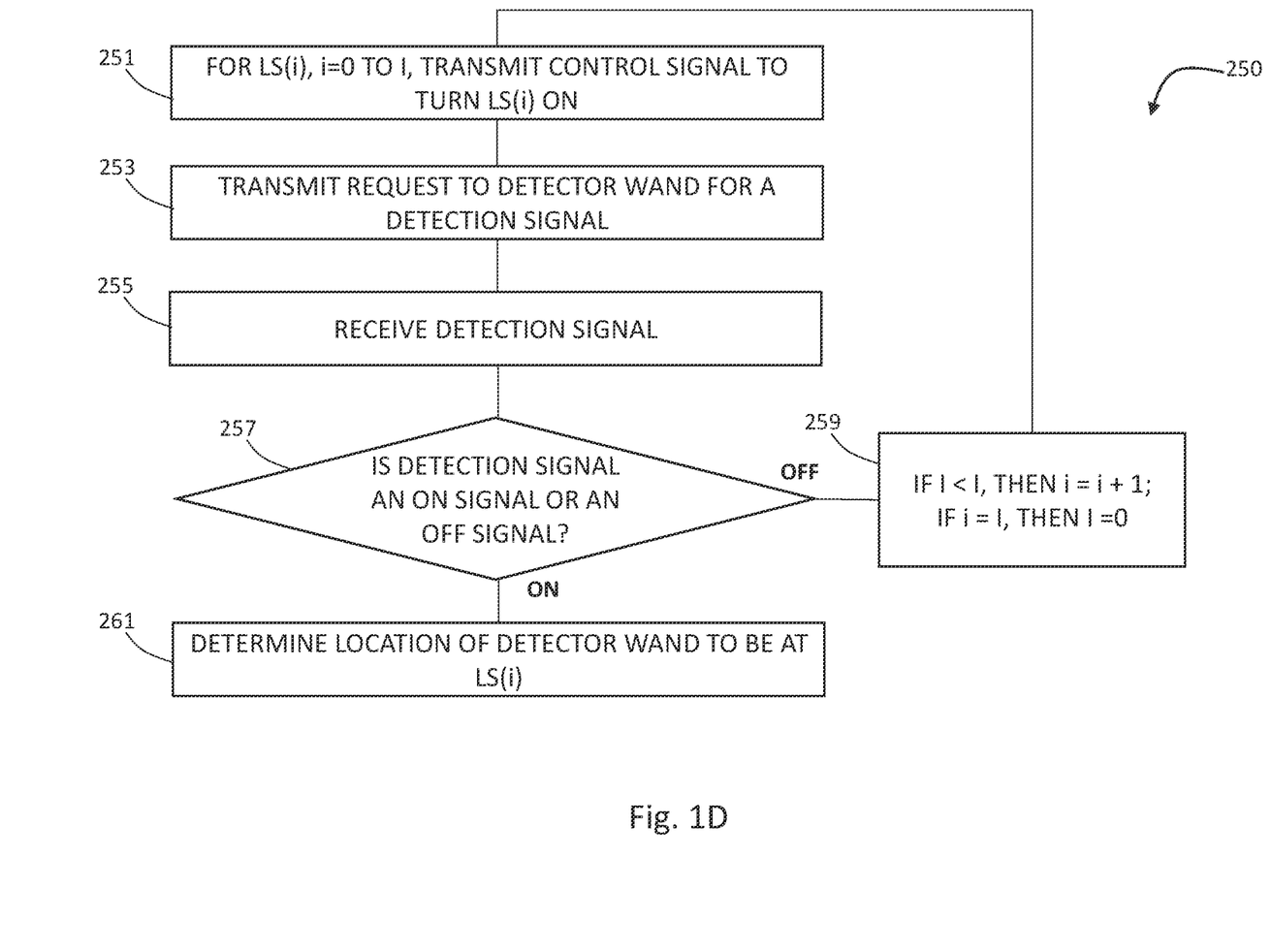
FIG. 1D shows a flowchart showing another embodiment of a Detector Wand Search method in accordance with an embodiment of the disclosure.

The determination of Detection Wand 130 location may be accomplished in one of a number of methods. In a "synchronous", or "request-response", mode, control unit 120 queries Detector Wand 130 whether or not the Detector Wand detected light emitted from LS 111 activated by the control unit. An example of the request-response mode is illustrated as flowchart 250 shown in FIG. 1D, which describes an embodiment of a request response mode operated by, by way of example, Detector Locator system 100 shown in FIGS. 1A-1B. Each time control unit 120 transmits a LS control signal to activate a given LS 111 (block 251), control unit 120 also queries Detector Wand 130 to transmit back to the control unit a detection signal (block 253). Once the control unit receives the detection signal (block 255), it determines whether the detection signal is an ON signal or an OFF signal (decision block 257). If the detection signal is an OFF signal 140, control unit 120 repeats the process by activating the next LS 111 in LS array 110, or the first LS in the LS array if the previously activated LS was the last one in the array (block 259). If the detection signal is an ON signal 141, control unit 120 designates the currently active LS 111 as the triggering LS 111* and determines Detector Wand 130 to be located near the triggering LS (block 261). The difference between the detection signal being OFF signal 140 or ON signal 141 may be a difference in an illumination value encoded in the detection signals responsive to an intensity of light detected by light detector 131, and control unit 120 may be configured to designate a detection signal having an illumination value above a predetermined threshold to be an ON signal 141 and to designate a detection signal having an illumination value below a predetermined threshold to be an OFF signal 141.

In a "timing" mode, Detector Wand 130 transmits detections signals spontaneously, without needing to receive a query from control unit 120, to inform the control unit when Detector Wand 130 has detected light. Optionally, control unit 120 transmits detections signals (either an OFF signal 140 or an ON signal 141) as predetermined frequency. Because only one LS 111 is on at a given moment, control unit 120 may determine which LS 111 triggered the transmission of an ON signal 140 based on the timing of reception of ON signal 141, and thus consequently also determine the location of Detection Wand 130.

By way of numerical example, in a case where Detector Wand 130 samples for the presence of light and transmits a detection signal at a rate of 100 Hz, and control unit 120 activates a new LS 111 at a rate that is substantially slower, by way of example 50 Hz. In such an arrangement, control unit 120 will receive, for each LS 111 it activates, at least one detection signal within the timeframe of activation for that given LS.

By way of another numerical example, control unit 120 controls LS array 110 to activate a new LS 111 at a rate of 100 Hz, or one every 10 milliseconds (msec), so that in a case where LS array 110 includes fifty (50) LSs 111, it would take 500 msec (half a second) for each LS to have turned on once during global search mode. Detection Wand 130 may be configured so that the duration between light from triggering LS 111* contacting light detector 131 of Detector Wand 130 is about or less than 1 millisecond. In such a case, where the period of the activation cycle for LSs during the global search scan is substantially slower than the signal transduction time from Detector Wand 130 (10 msec compared to 1 msec), control unit 120, upon receiving detection signal 140 from Detection Wand 130, may simply determine the last-activated LS 111 to be the triggering LS. By way of example, if a given LS 111 was instructed by control unit 120 to be illuminated at t=460 msec, and control unit received a detection signal 140 at t=461 msec, the control unit may determine that LS 111 to be triggering LS 111*.

Upon determination of triggering LS 111* (whether operating in response-request mode or timing mode), control unit 120 may be configured to transmit, optionally via wireless transceiver 122, a status signal 142 encoding a status value responsive to the LS address of triggering LS 111*. The status value may comprise, by way of example, the LS address, a distance along LS array 110, or another distance related to the distance along LS array 110.

Optionally, after the location of Detector Wand 130 is determined, control unit 120 switches operation to a local search mode, in which control unit 120 activates one LS 111 at a time, one after the other in sequence, in a subset of LSs 111 flanking triggering LS 111* previously determined in block 205 of flowchart 200 to have emitted the light that triggered the transmission of detection signal 140. By way of example, the flanking subset of LSs may comprise between one and ten LSs 111 flanking LS 111*. In an embodiment where five flanking LSs 111 on either side of LS 111* are activated one after the other during the local search mode, the activation of the flaking LSs may be controlled so that a human observer would perceive it as eleven LEDs (five LSs on one side of triggering LS 111*, five LSs on the other side of triggering LS 111*, and triggering LS 111* itself) that are on simultaneously (if the switching between LSs is too fast for human perception) or in a moving pattern (if sufficiently slow for human perception). Optionally, when Detector Wand 130 is moved so that it becomes activated by a different LS 111, the identity of the triggering LS 111* becomes updated to reflect the new location of the Detector Wand, so that the local search mode continues with the LSs flanking the new triggering LS 111*. It will be appreciated that the updating of the triggering LS 111* and a resultant shifts in the subset of LSs activated in the continued local search mode may provide to a human user an appearance of the subset of LSs following the Detector Wand.

Optionally, control unit 120 is configured so that if no ON signal 140 is received within a predetermined time window, the activation mode of control unit 120 reverts to the global search mode. Detector Wand 130 may cease to transmit ON signals 140 in a number of circumstances, by way of example if the Detector Wand 130 is moved sufficiently away from LS array 110, or if the Detector Wand is quickly moved further along the LS array so that it is no longer located within proximity of the subset of LSs active in local search mode (although, if the rate of sequential activation of the LSs 111 during local search mode is sufficiently fast, a regular human user may be unable to move the Detector Wand quickly enough).

With reference to FIGS. 1A-1B, in an embodiment, detection signals such as OFF signal 140 and ON signal 141 may also be received by a location monitor (not shown), optionally a smartphone, that is operable to display information to a user regarding the location of Detector Wand 130 responsive to the detection signals.

Whereas Locator Detector system 100 as shown in FIGS. 1A-1B is a light-based system, it will be appreciated that the system may be based on other types of EMR. By way of example, LS 111 may be replaced with any one the following EMR sources: a radio wave emitter configured to emit EMR within a radio wave frequency range; an infrared emitter configured to emit EMR within an infrared range; a visible light emitter configured to emit EMR within a visible light range; or an ultraviolet (UV) emitter configured to emit EMR within a UV range. In conjunction, light detector 131 comprised in Detector Wand 130 may be replaced with an appropriate EMR detector configured to be sensitive to the EMR emitted by the EMR sources. By way of example, in an embodiment where the EMR sources are radio wave emitters, the the Detector Wand comprises a radio wave detector configured to detect radio waves within the frequency range emitted by the radio wave emitters.

Figure 2A:
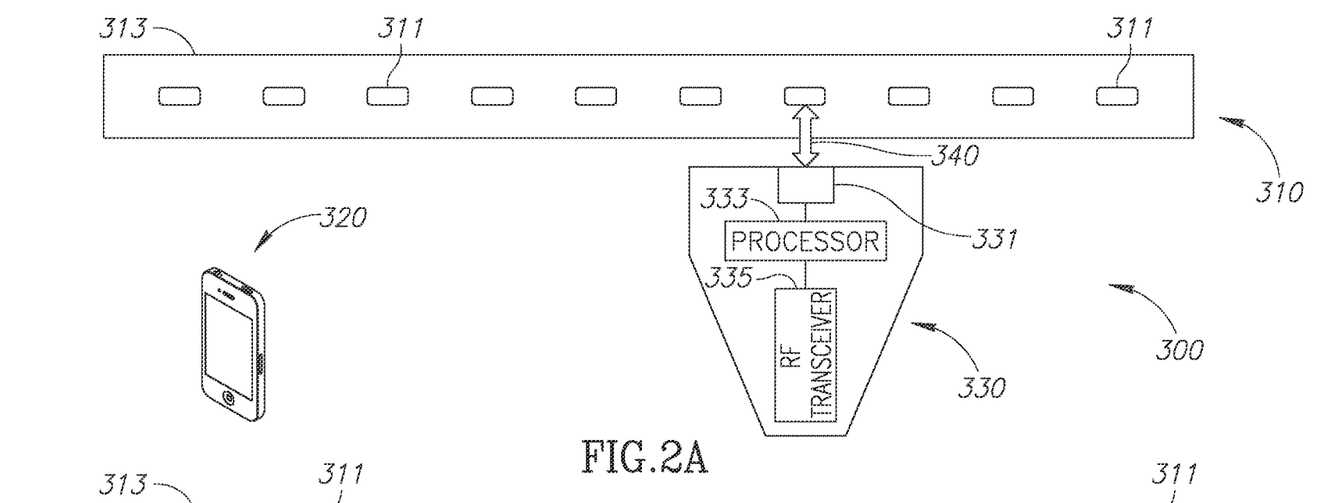
FIG. 2A-2B schematically show a Detector Locator system configured to operate in a trigger mode in accordance with an embodiment of the disclosure.
Figure 2B:
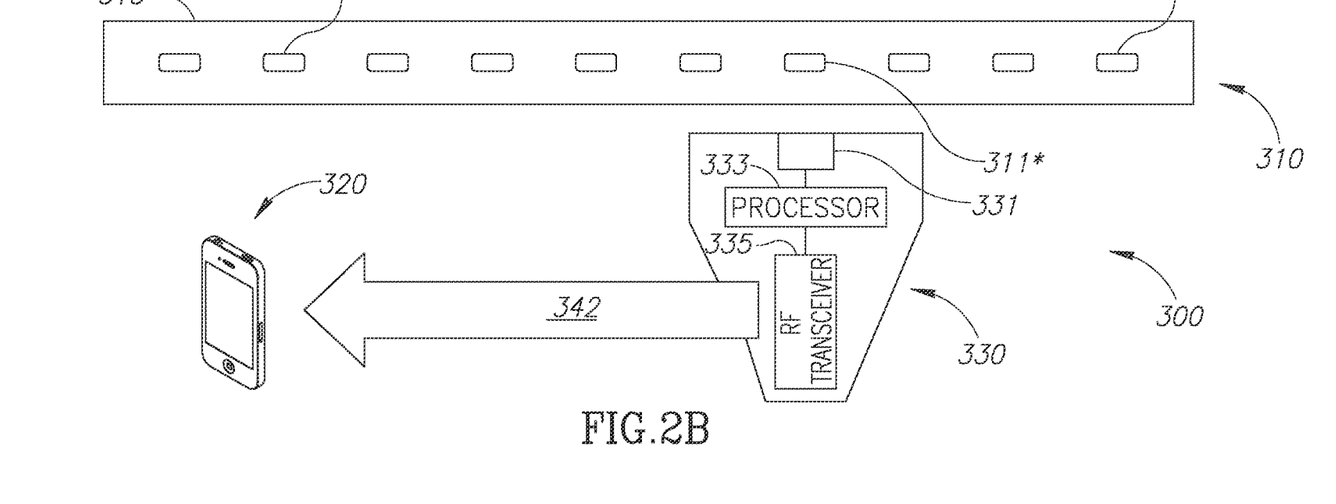

Reference is now made to FIGS. 2A-2B, which show a Detector Locator system 300 configured to operate in a "trigger" mode in accordance with an embodiment of the disclosure. Detector Locator system 300 comprises a linear array 310 of radio frequency identification (RFID) tags 311 and a detector wand 330 configured to a detect RF signals emitted from the RFID tags.

RFID array 310 may comprise a plurality of RFID tags 311, and a support strip 313 onto which the RFID tags are mounted. The RFID tags comprise an RF-transceiver and a processor (not shown) that, based on a set of stored instructions, is configured to register reception of an interrogator signals emitted from an RFID reader, then instruct the RF-transceiver to transmit an RF response signal comprising an ID of the RFID tag back to the RFID reader in response to the interrogator signal. A given RFID tag out of the plurality of RFID tags 311 that, at a given time, is triggered by an interrogator signal to transmit an RF response signal in response may be referred to as a triggered RFID tag, and numerically indicated with reference numeral 311*.

Detector wand 330 comprises an RFID reader 331 configured to detect RF signals emitted by RFID tags 131. An RFID tag 311 typically has a characteristic emission spectrum and a data encoding standard, and RFID reader 331 may be configured to receive RF transmissions within the emission spectrum and data encoding standard of the RFID tag. Detector wand 330 further comprises a wireless transceiver 335 and a processor 333 that, based on a set of instructions stored in a memory (not shown), coordinates actions of RFID reader 331 and wireless transceiver 335. RFID reader 331 is configured to (1) transmit interrogator signals configured to trigger RF response signals from RFID tags and (2) receive RF response signals transmitted from the triggered RFID tag, which as noted above comprised an ID of the RFID tag. The transmission an interrogator signal and subsequent reception of an RF response signal is schematically shown in FIG. 2A as double block arrow 340.

As shown in FIG. 2B, Detector Wand 330 is configured so that, upon RFID reader 331 receiving a RF response signal, wireless transceiver 335 transmits a detection signal 342 to a location monitor 320 operable to display information to a user regarding the location of Detector Wand 330 responsive to detection signal 342. Optionally, as shown in FIGS. 2A-2B, location monitor 320 may be a smartphone. Detection signal 342 may comprise the ID of triggering RFID tag 311*. Optionally, detection signal 342 comprises a field encoding a distance in a predetermined unit of measurement (by way of example meter, centimeter, or inch) along a length of RFID tag array 310 based on the ID of triggering RFID tag 311*.

Figure 3:
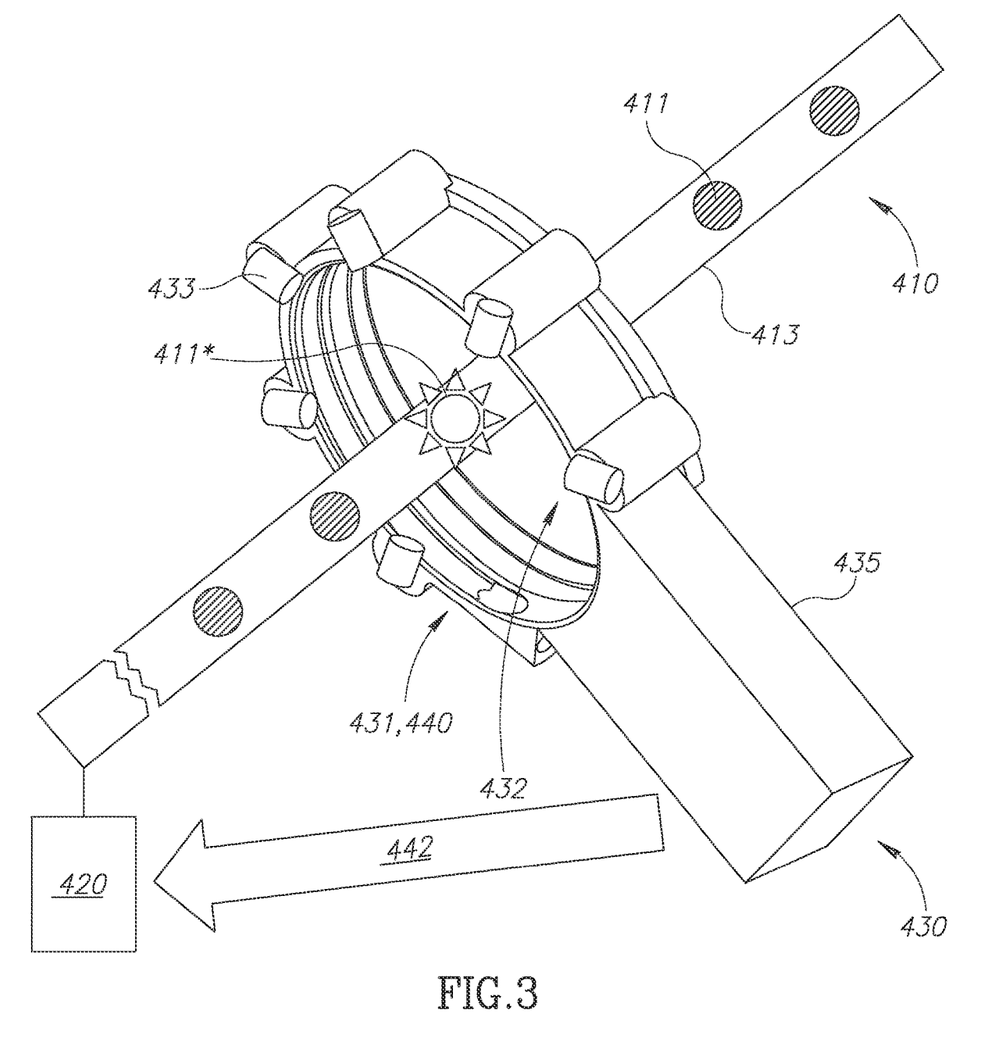
FIG. 3 schematically shows a Port-Dec comprising a passage tube, as well as a support strip comprising a plurality of LEDs being passed through the passage tube, in which the passage tube is embedded with a TOP sensor in accordance with an embodiment of the disclosure.

Reference is now made to FIG. 3, which shows a Detector Locator System 400 operating in a light-based mode, comprising a linear LS array 410, a Detector Wand 430, and a control unit 420 in accordance with an embodiment of the disclosure.

Linear LS Array 410 comprises a plurality of LSs 411 mounted on a support strip 413. Detector Wand 430 may comprise a passage tube 431 having an interior space 432 that is dimensioned to allow LS array 410 to be passed therethrough. A plurality of light detectors 433, by way of example photodiodes configured to detect light within the emission spectrum of light emitted by LSs 411, may be positioned on passage tube 431 to preferably detect light being emitted from interior space 432 of the passage tube 431, by way of example from triggering LS 411* as shown in FIG. 3. The plurality of light detectors 433 may be arranged as an omni-directional detector configured to receive light emitted from the LS independent of the wand holding orientation. Detector Wand 430 further comprises a processor (not shown) operable connected to light detectors 433 and to a wireless transceiver (not shown) optionally within handle 435, and is configured so that the wireless transceiver transmits an ON signal, schematically indicated as block arrow 442, when the light detectors receive sufficient light to indicate that an LS 411* is in an illuminated state within interior space 432. Alternatively, the wireless transceiver may intermittently transmit, regardless of the degree of light detection, a detection signal encoding an illumination value responsive to an intensity of light detected by light detectors 433, and control unit 420 may be configured to designate a detection signal having an illumination value above a predetermined threshold to be an ON signal and to designate a detection signal having an illumination value below a predetermined threshold to be an OFF signal.

Whereas Detector Wand 430 is described in the context of the light-based Detector Locator System operating in a timing mode, it will be appreciated that a Detector Wand comprising a passage tube is also appropriate for use in a Detector Locator System operating in a trigger mode, and/or for a Detector Locator System based on other EMR types, such as infrared, UV, or radio waves. By way of example, in a radio wave-based system, Linear LS Array 410 may be replaced with an array of RFID tags, each RFID tag configured to transmit an RF signal encoding an ID when activated, and passage tube 431 may be mounted with one or more RFID readers rather than with light detectors 433. In addition, whereas interior space 432 of passage tube 431 as shown in FIG. 3 has a circular transverse section, the present disclosure is not limited to any particular shape of the interior space. The transverse section of interior space 432 may be an oval, a pill shape, a square, a rectangle, or any geometric or irregular shape provided that it allows passage of an appropriate linear ERM source array.

Passage tube 431 of Detector Wand 430 may be configured as a TOP sensor 440 in accordance with an embodiment of the disclosure.

Figure 4:
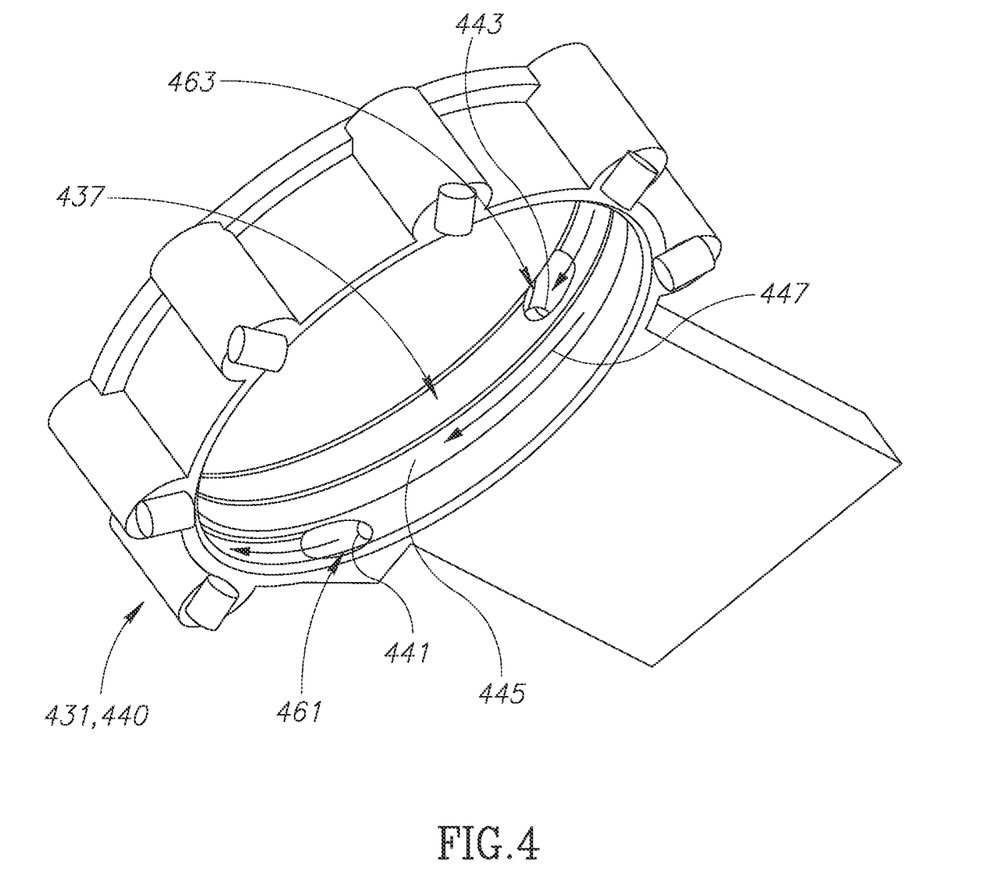
FIG. 4 schematically shows another view of the Port-Dec shown in FIG. 3.

Reference is now made to FIG. 4, showing Detector Wand 430 in isolation and from another perspective to allow for a better view of inner surface 437 of passage tube 431, as well as aspects relevant to the function of TOP sensor 440, which may be comprised in Detector Wand 430 as shown in FIG. 4 or alternatively as a separate apparatus.

TOP sensor 440 comprises an infrared (IR) emitter 441, an IR detector 443 (optionally an IR photodiode), and a light path 445 comprising a reflective surface. The reflective, concave surface comprised in light path 445 provides a path through which at least a portion of IR light emitted from IR emitter 441 reaches IR detector 443. The passage of IR light from IR emitter 441 to IR detector 443 through light path 445 is schematically illustrated as arrows 447.

Figure 5A:
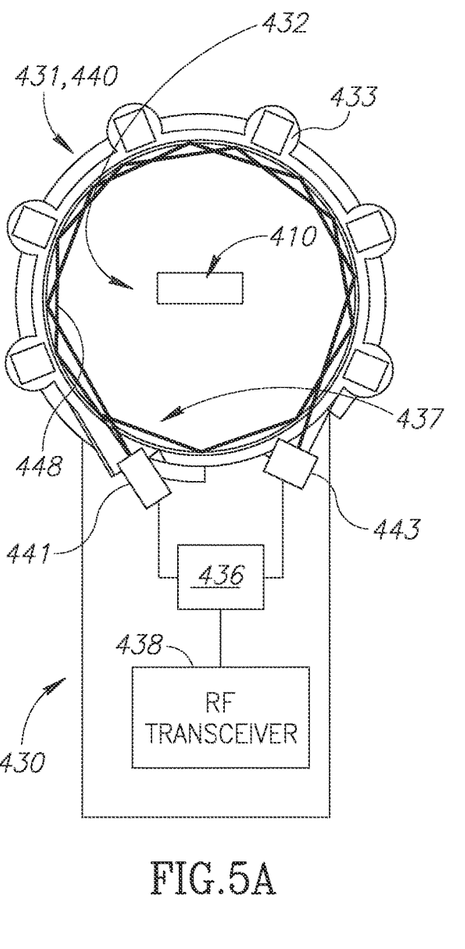
FIGS. 5A-5B schematically shows the TOP sensor in operation in accordance with an embodiment of the disclosure.
Figure 5B:
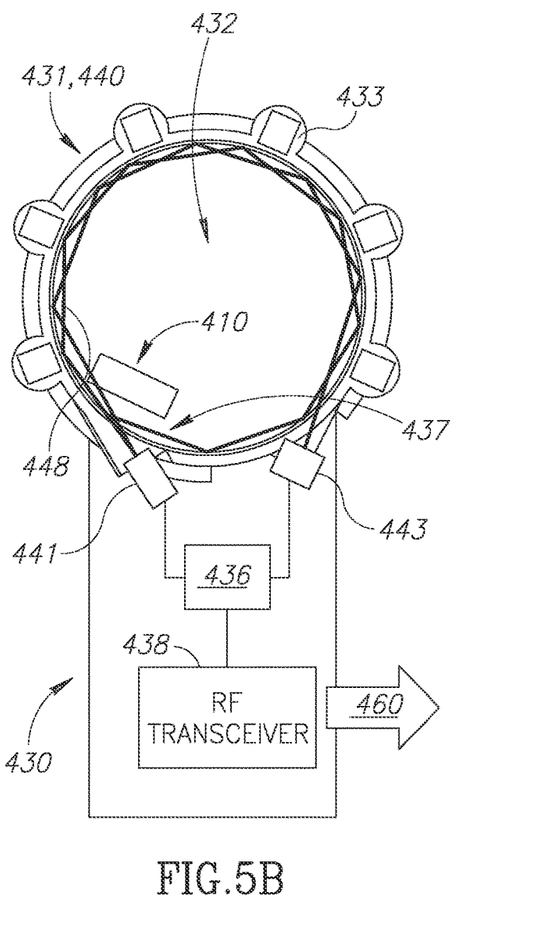

Reference is now made to FIGS. 5A-5B, which shows aspects of the operation of TOP sensor 440. FIG. 5A shows Detector Wand 430 with LS array 410 at a central region of interior space 432 within passage tube 431, and away from interior surface 437 of passage tube 431. By contrast, FIG. 5B shows Detector Wand 430 with LS array 410 positioned near interior surface 437. IR emitter 441, IR detector 443, and light path 445 is configured so that most of the IR radiation (schematically illustrated as dark line 448) being emitted by IR emitter 441 and received by IR detector 443 travels along or near interior surface 437.

As shown in FIGS. 5A-5B, IR emitter may be aimed so that the axis of the beam of light (collimated or non-collimated) has a relatively shallow angle of incidence with respect to the reflective surface of light path 445 (see FIG. 4). The angle of incidence may be less than 15 degrees, less than 10 degrees, or less than 5 degrees. As a result of the shallow angle of incidence, most or all of the light emitted by IR emitter 441 travels along the light path, staying relatively close to inner surface 437 and away from the center of interior space 432. In addition, due to the placement of IR emitter 441, IR detector 443, and arrangement of light path 445, the emitted light travels around the transverse section of inner surface 437 for about 1.75 revolutions before reaching the IR detector. The disclosure includes other embodiments in which the light path between the IR detector and the IR emitter is between one and two revolutions around the transverse section of the inner surface or even a partial revolution.

Assuming that IR emitter 441 emits IR radiation at a constant flux, the flux of the IR radiation received by IR detector 443 would also be constant. However, should Detector Wand 430 be moved so that an object, such as LS array 410, be situated close to inner surface 437 (as shown in FIG. 5B), a portion of IR radiation 448 emitted by IR emitter 441 would be blocked, and IR detector 443 would register a reduction in the flux of the IR radiation being received from IR emitter 441. As such, proximity of LS array 410 to inner surface 437 of passage tube 431 can be reliably inferred from the reduction in IR radiation detected by IR detector 443.

Processor 436 may be operatively coupled to wireless transceiver 438 and IR detector 443, and may be configured to instruct wireless transceiver 438 to transmit a proximity signal 460 responsive to the flux of IR radiation detected by IR detector 443 falling below a predetermined threshold or the analog level. Alternatively, the wireless transceiver may intermittently transmit, regardless of the degree of light detection, proximity signal 460, with the signal encoding a proximity value responsive to the intensity of light detected by IR detector 443, and a device receiving the proximity value may be configured to initiate an action responsive to the proximity value reaching a predetermined threshold.

As seen in FIGS. 4 and 5A-5B, TOP sensor 440 may be configured to prevent or minimize IR radiation emitted from IR emitter 441 to directly reach IR detector 443, so that IR radiation that is reflected along light path 445 is preferably able to reach IR detector 443. IR emitter 441 may be placed within a recessed opening 461 that opens into light path 445 that is shaped as a grooved path, so that IR radiation directed "off-path" in a direction that is not aligned with light path 445 is blocked or reflected. Moreover, IR detector 443 may be placed within a recessed opening 463 to prevent IR radiation from another source, or IR radiation from IR emitter 441 that did not traverse light path 445 via reflection, from reaching IR detector 443.

IR emitter 461 may be configured to emit collimated IR radiation or non-collimated IR radiation. Optionally, IR emitter 461 is an IR-emitting LED. In certain embodiments, it was surprisingly found that non-collimated IR radiation, by way of example from an IR-emitting LED, resulted in a region near inner surface 437 where there was a linear relationship between IR radiation intensity received by IR detector 443 and proximity of linear LS array 410 to inner surface 437.

Whereas TOP sensor 440 is described with respect to FIG. 3 as detecting proximity of LS array 410 to inner surface 437, it will be appreciate that TOP sensor 440 may be used to monitor the proximity of any object placed inside interior space 432 with respect to inner surface 437. The quantitative relationship between proximity of the object placed within interior space 432 and the IR radiation intensity received by IR detector 443 will depend on the shape and IR transparency of the object, and a conversion table or formula for converting the intensity of IR radiation received by IR detector 443 to the proximity of the object to inner surface 437 may be derived through prior testing and saved in a memory (not shown) comprised in TOP sensor 440.

Whereas interior space 432 of passage tube 431 as shown in FIGS. 5A-5B has a circular transverse section, the shape of the TOP sensor, the passage tube, or interior space within the passage tube, is not limited to the particular shape shown in the figures. The transverse section of interior space 432 in the context of a TOP sensor may instead be an oval, a pill shape, or any shape in which interior surface 437 has concave and optionally straight portions, but not convex portions.

Whereas TOP sensor 440 as described with respect to FIGS. 4 and 5A-5B is IR-based, using IR emitter 441 and IR detector 443, it will be appreciated that other embodiments of a TOP sensor may utilize non-IR EMR, by way of example visible light or UV light.

It will be appreciated that Detector Wand 430 as shown in FIGS. 3, 4 and 5A-5B is configured to perform two separate light-mediated functions: (1) determine, as part of Detector Locator System 400, the position of Detector Wand 430 along the length of linear LS array 410 using light detectors 433 that have a spectral receptivity matched to the emission spectrum LSs 411, and (2) determine, based on TOP sensor 440, proximity of linear LS array 410 to inner surface 437 of passage tube 431 using IR detector 443. As noted above, both LS 411 and IR emitter 431, in a given embodiment of a Detector Wand, may operate in any EMR spectrum. However, it would advantageous for LSs 411 and light detectors 433 on the one hand, and IR emitter 441 and IR detector 443 on the other, to operate within non-overlapping EMR spectra so that the operation of one function does not interfere with operation of the other.

Whereas, in FIGS. 4 and 5A-5B, a TOP sensor was described in the context of a Detector Locator System, the disclosure includes a TOP sensor that is configured independently and separately from Detector Wand as well as a Detector Locator System.

A Detector Locator System as described herein may be used for a variety of different applications. A number of examples are provided herein below.

Figure 6:
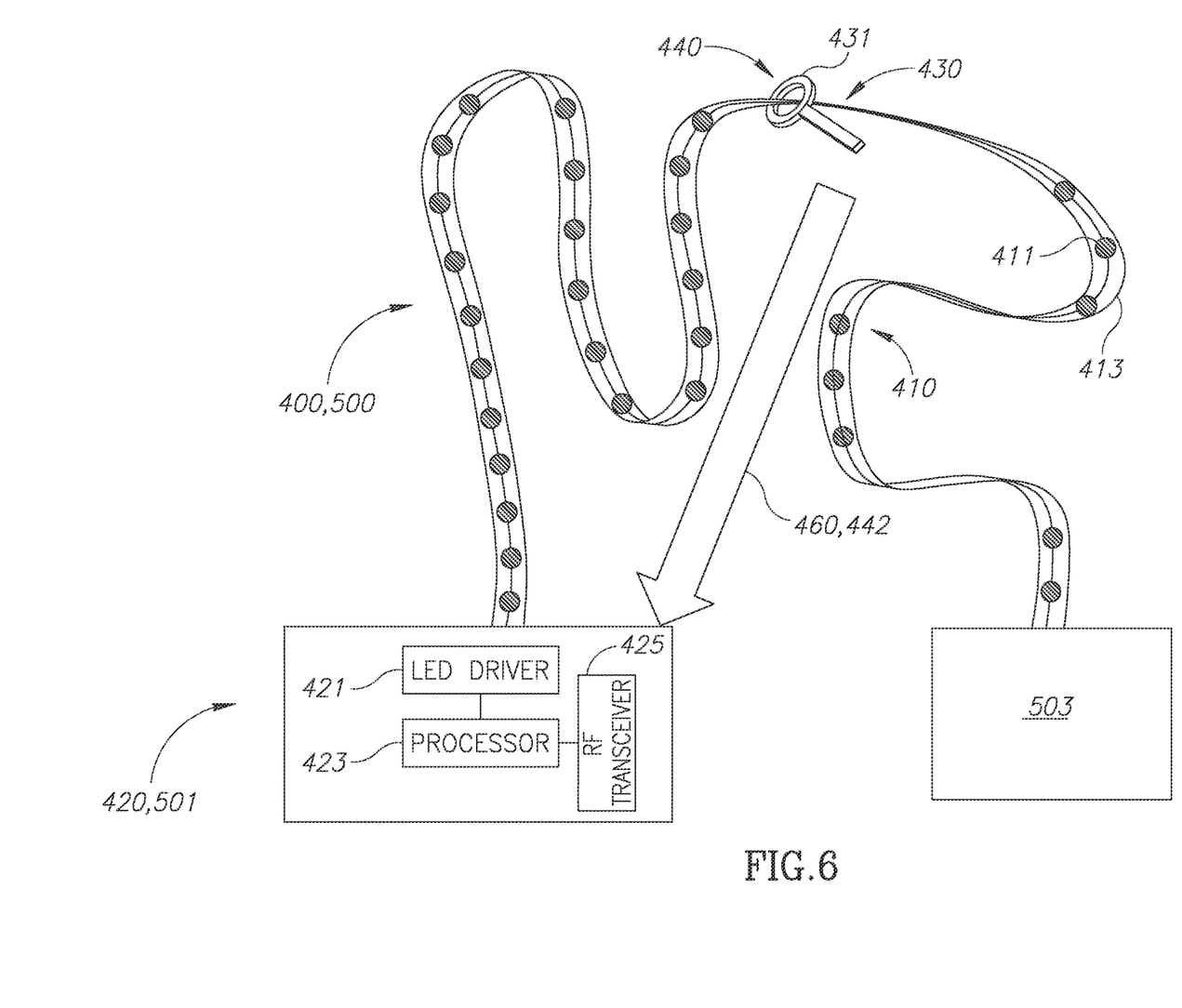
FIG. 6 shows a game system comprising a Detector Locator system and a TOP sensor in accordance with an embodiment of the disclosure.

FIG. 6 schematically shows a "Light Dragger" game 500 that makes use of Detector Locator System 400 with Detector Wand 430 comprising TOP sensor 440. Linear LS array 410 is supported by two base units 501, 503. As shown in FIG. 6, control unit 420 is comprised in base unit 501.

Control unit 420 comprises a LS driver 421, to which LSs 411 are operatively connected. LS driver 421, responsive to instructions from processor 423, is configured to transmit a LS control signals that controls activation and inactivation for LSs 411. Control unit 420 also comprises wireless transceiver 425 that is operable to receive wireless signals from Detector Wand 430. The wireless signals may include proximity signals 460 as shown in FIG. 5B indicating proximity of support strip 413 to inner surface 437 of TOP sensor 430, as well as ON signals 442 indicating detection of light emitted by one of LSs 411 by light detectors 433 (not shown in FIG. 6) comprised in Detector Wand 430. Proximity signal 460 and ON signal 442, when received by RF communication module 245, may be processed by processor 423 to control LSs 411.

Game system 500 may be operable to provide one or more games modes that tests fine motor skills of a player. In a "Light Dragger" mode, the goal of the game is to pass Detector Wand 430 from one end of Linear LS array 410 to another while making sure to not let passage tube 431 get in contact with the Linear LS array. Detector Locator System 400 is utilized to keep one or more LSs closest to Detector Wand 430 illuminated as a visual indicator, and TOP sensor 440 is used to indicate whether or not the player has successfully avoided having Linear LS array 410 make contact with passage tube 431. Detector Wand 430 may be configured so that, upon Linear LS array 410 getting too close to the inner surface of passage tube 431, Detector Wand 430 transmits proximity signal 460 to control unit 420, which then control LS 411 to make an indication ("loss indication") of loss of the round of game play. The loss indication may be one or a combination of: a particular pattern of activation for LSs 411; a deactivation of LSs 411; and a sound played by a speaker (not shown) comprised in control unit 420.

In a "Follow the Leader" mode, control unit 420 may first demonstrates a "route" by illuminating LSs 411 in a sequence that is to be copied by the player. Detector Locator System 400 is utilized to keep one or more LSs closest to Detector Wand 430 illuminated as a visual indicator. Moreover, the location of Detector Wand 430, which is registered by processor 432 during play, is recorded in a memory (not shown) to generate a record of the movement of Detector Wand 430. The record is them compared with the route initially demonstrated by control unit 420. If the record sufficiently matches the route, then control unit 420 generates an indication of a win, by a pattern of LS activation, sound generation, or both.

In a "Ping Pong" mode, game system 500 includes a second Detector Wand. Detector Locator System 400 tracks the location of each Detector Wand along Linear LS array 410. Control unit 420 generates a virtual "ball" indicated by activation of appropriate LSs 411, and each Detector Wand is controlled to serve as rackets for each player to virtually strike the "ball" towards each other.

Figure 7:
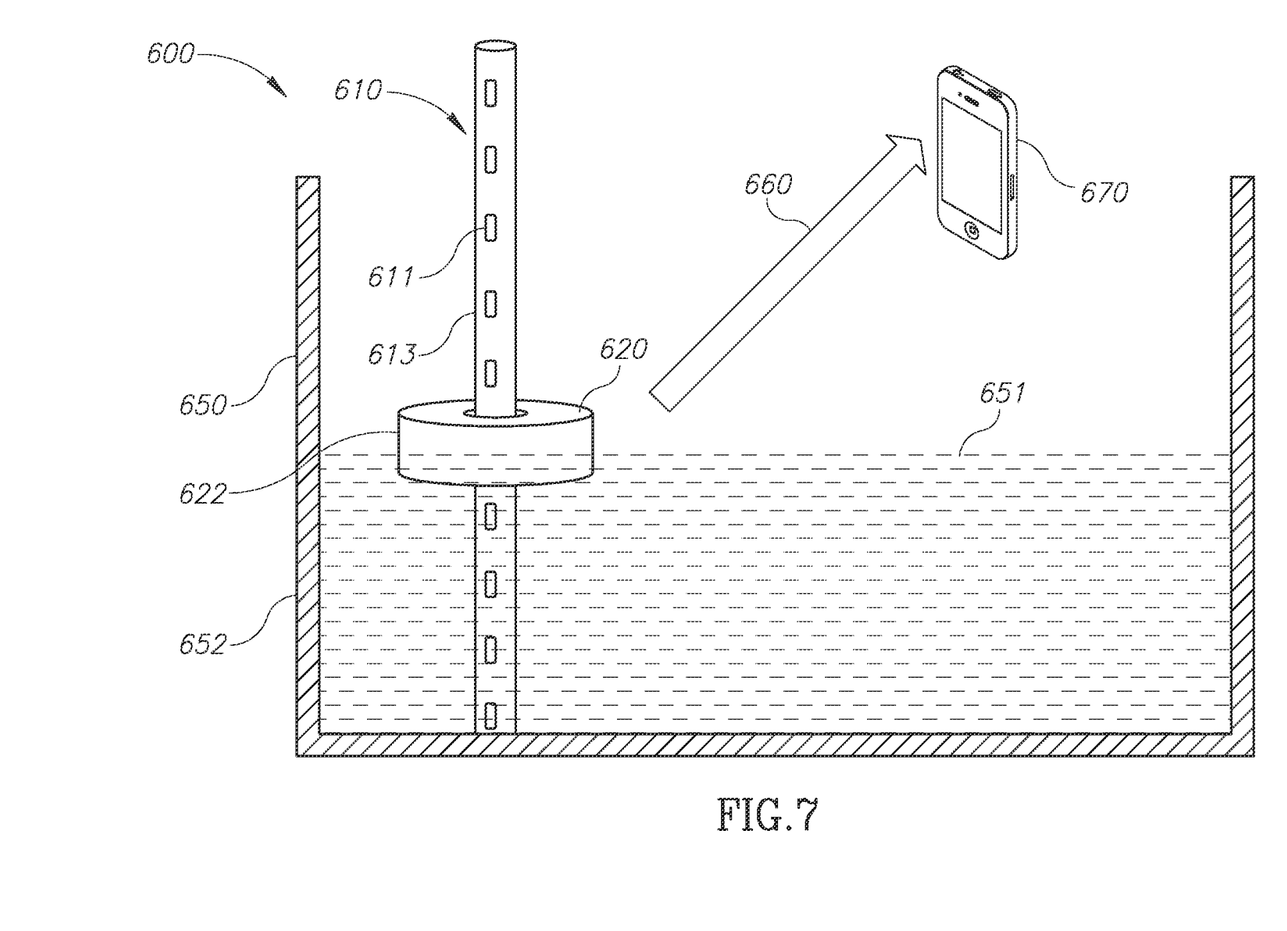
FIG. 7 shows a depth monitor system comprising a Detector Locator system in accordance with an embodiment of the disclosure.

Detector Locator system in accordance with and embodiment of the disclosure can be applied to any use that requires tracking a location of an object along a EMR source strip comprising a linear array of EMR sources. An example is shown in FIG. 7, which shows a depth monitor system 600 for a pool 650 filled with water 651. Depth monitor system 600 comprises an RFID array 610, a Detector Ring 620 comprising an RFID reader (not shown), a processor (not shown), and a wireless transceiver (not shown).

RFID array 610 comprises a plurality of RFID tags 611 mounted onto or embedded within a support strip 613. The RFID tags are made waterproof or embedded within support strip 613 to protect the RFID tags from water damage.

Detector Ring 620 is configured to be afloat in water. RFID array 610 is stably and vertically positioned in pool 650 and within a through hole 622, so that RFID array 610 is slidably secured within the through hole. Given this arrangement, the vertical position of the Detector Ring along the length of RFID array 610 changes depending on the water level in the pool. An RFID reader comprised in Detector Ring 620 exchanges interrogation and response signals with the closest RFID tag out of RFID tags 611, and the Detector Ring intermittently sends out a depth signal, schematically indicated as a block arrow 660, which encodes a depth measure that is calculated based on the ID of the most proximate RFID tag to the Detector Ring at any given time. Depth signal 660 may be received by a computing device, such as a smartphone 670, that is configured to display a depth of the pool responsive to depth signal 660. In an alternative embodiment (not shown), Detector ring 620 may be stably positioned, by way of example fixedly attached to a side wall 652 of pool 650, with RFID array 610 configured to float freely within through hole 622 of Detector Ring 620.

Whereas depth monitor system 600 is described herein above with respect to the EMR source strip being an RFID strip, it will be appreciated that, in an alternative embodiment of the depth monitor system, the EMR source strip may comprise a plurality of light sources, by way of example LEDs, and depth signal 660 may be configured as detection signals as described with respect to FIGS. 1A-1D.

Figure 8:
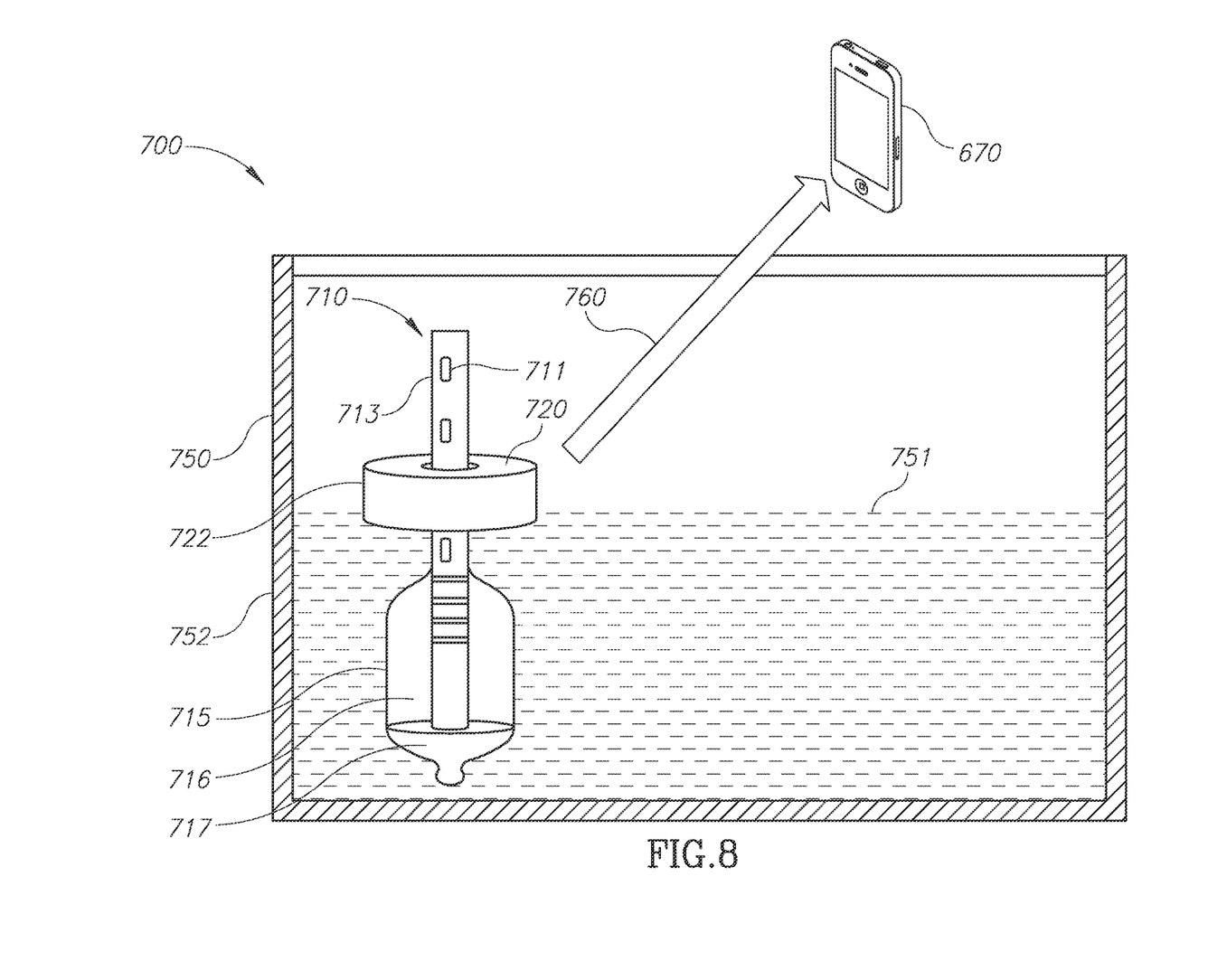
FIG. 8 shows a digital hydrometer comprising a Detector Locator system in accordance with an embodiment of the disclosure.

Another example application of a Detector Locator system is shown in FIG. 8, which shows a digital hydrometer 700 being used to measure density of a liquid ferment 751 being fermented in a vat 750. Digital hydrometer 700 comprises an RFID array 710, a Detector Ring 720 comprising an RFID reader (not shown), a processor (not shown), and a wireless transceiver (not shown). RFID array 710 comprises a plurality of RFID tags 711 mounted onto or embedded within a support strip 713. The RFID tags are made waterproof or embedded within support strip 713 to protect the RFID tags from water damage.

The liquid ferment may be for, example, beer or wine that is in the process of being fermented. The density of Detector Ring 720 is set so that it readily floats on the top surface of liquid ferment 751, but readily sink below any foam that may form above the liquid ferment. RFID array comprises a buoyancy device 715 comprising an air compartment 716 and ballast 717 that is calibrated to have the device as a whole to be at an appropriate density for its use as a hydrometer, in which an increase in density of liquid ferment 751 causes RFID array 710 to sink further down ferment and a reduction in density of the liquid ferment causes RFID array 710 to rise further up. In light of the above noted configuration of Detector Ring 720, RFID array 710 and buoyancy device 715, the particular RFID tag 711 of the RFID array 710 read by Detector Ring 720 is based on the depth of buoyancy device 715, which as noted above is based on the density of liquid ferment 751.

The RFID reader comprised in Detector Ring 720 exchanges interrogation and response signals with the closest RFID tag out of RFID tags 711, and the Detector Ring intermittently sends out a status signal, schematically indicated as a block arrow 760. The status signal may encode, responsive to the ID signals received from the RFID tags, one or more status values responsive to the density of liquid ferment 751. The status values may comprise, by way of example density or a related value such as sugar concentration or alcohol concentration. Status signal 760 may be received by a computing device, such as a smartphone 770, that is configured to display a value based on status signal 760.

Whereas digital hydrometer 700 is described herein above with respect to the EMR source strip being an RFID strip, it will be appreciated that, in an alternative embodiment, the EMR source strip may comprise a plurality of light sources, by way of example LEDs, and status signal 760 may be configured as detection signals as described with respect to FIGS. 1A-1D.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A proximity sensor comprising:
   a loop comprising an outer surface and an inner surface, at least a portion of the inner surface being a reflective surface;
   a light emitter positioned to emit light onto the reflective surface;
   a light detector positioned to preferentially receive light emitted from the light emitter and reflected from the reflective surface; and
   a processor that is configured, responsive to a set of instructions stored in a memory, to determine a degree of proximity of an object to the inner surface of the loop responsive to a reduction in an intensity of light emitted from the light emitter that is received by the light detector.

2. The proximity sensor according to claim 1, wherein the inner surface is shaped to have one or more concave portions, but no convex portions.

3. The proximity sensor according to claim 1, wherein the light emitter is configured to emit non-collimated light.

4. The proximity sensor according to claim 1, wherein the light emitter, light detector, and reflective surface are configured so that the light from the light emitter travels at least one full revolution around the transverse section of the loop prior to being received by the light detector.

5. The proximity sensor according to claim 1, wherein at least a portion of the light emitted by the light emitter initially strikes the reflective surface at an angle of incidence of 15 degrees or less.

6. The proximity sensor according to claim 1, wherein at least a portion of the light emitted by the light emitter initially strikes the reflective surface at an angle of incidence of 5 degrees or less.

7. Apparatus for testing a user's fine motor skills, the apparatus comprising:
   a proximity sensor according to claim 1; and
   a strip of material that passes through the loop of the proximity sensor and along which the user may manually translate the loop.

8. The apparatus according to claim 7 wherein the proximity sensor comprises a plurality of radiation detectors.

9. The apparatus according to claim 8 wherein the strip comprises a plurality of radiation sources distributed along the length of the strip that are controllable to emit radiation to which the radiation detectors are sensitive.

10. The apparatus according to claim 7 wherein the strip is an undulous strip.

* * * * *